Dec. 15, 1931.  A. WOLPERT ET AL  1,836,567
GAS SUPPLY CONTROLLING MECHANISM
Filed May 17, 1929
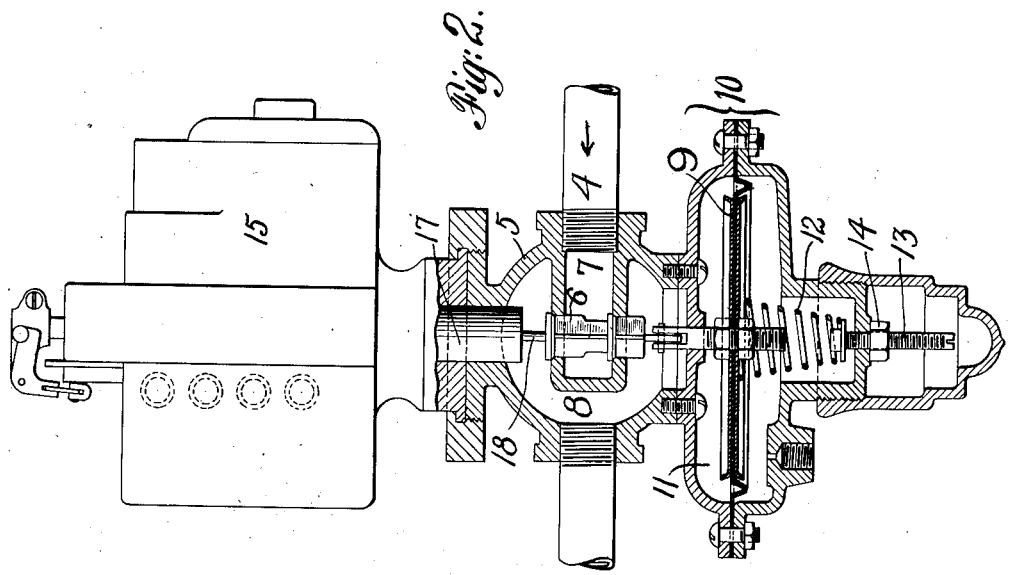
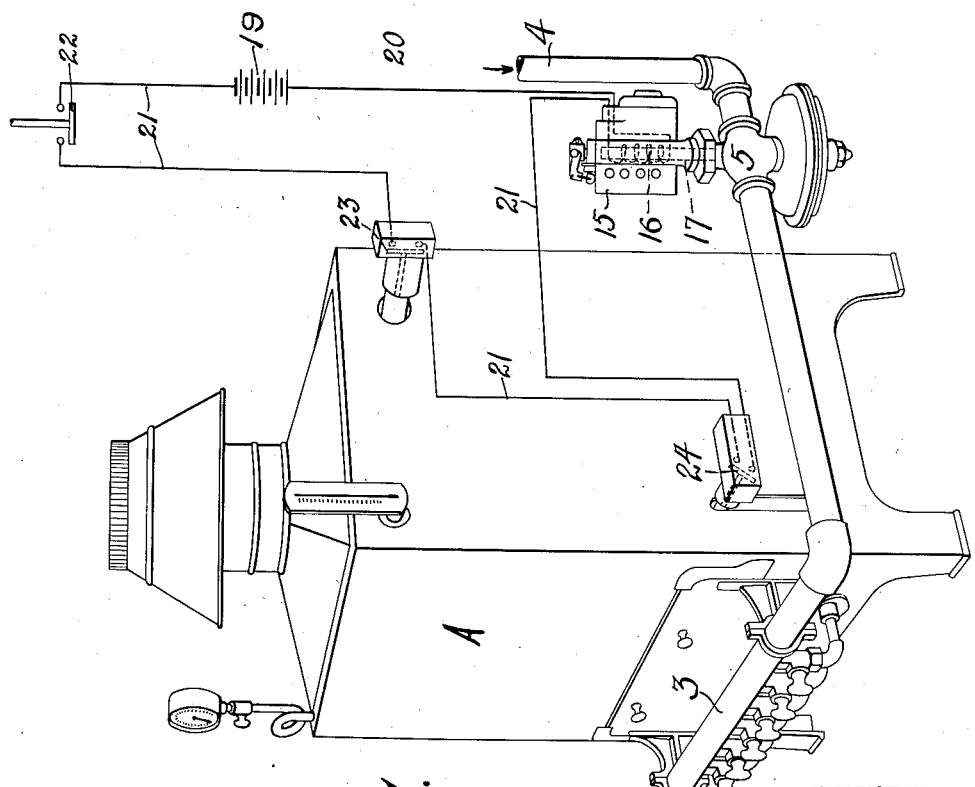
INVENTORS
Edward Lapp
Albert Wolpert
BY
ATTORNEYS Patented Dec. 15, 1931

1,836,567

UNITED STATES PATENT OFFICE

ALBERT WOLPERT AND EDWARD LAPP, OF PITTSBURGH, PENNSYLVANIA

GAS SUPPLY CONTROLLING MECHANISM

Application filed May 17, 1929. Serial No. 363,929.

This invention relates to an improved means for controlling the supply of gas to a furnace and is particularly useful for domestic heating installations in which gas is used as a fuel.

In installations of this kind there are a plurality of factors which should be taken into consideration in controlling the flow of the gas. In the first place the room or house temperature is generally kept at a certain average (in the neighborhood of 72 degrees Fahrenheit); in the second place what we may refer to here as the furnace temperature should be kept within safe limits, and, in the third place, whether or not the pilot light is burning must be taken into consideration in controlling flow of the gas to the main burners.

In addition to the foregoing it is generally customary to provide what is known as a pressure regulating valve in the gas supply line for the purpose of maintaining a constant pressure at the burners, regardless of fluctuations in the line, such fluctuations in the line often amounting to considerable, especially where the mains of the gas company are inadequate for a constantly increasing demand.

The furnace temperature above mentioned in the case of a hot water furnace is, of course, the temperature of the water which should not be permitted to rise above a certain maximum, which may be said to be in the neighborhood of 15 or 20 degrees below boiling temperature. In the case of a hot air furnace this furnace temperature would, of course, be the temperature of the air within the furnace which should not be permitted to go above a certain maximum, depending upon the installation. In the case of a steam boiler the control of the gas is generally accomplished through the medium of either a steam pressure control or a low water cut-off, or both, and the expression "furnace temperature" which we will use in this application is to be construed as including such a control. In connection with the pilot light the supply of gas, of course, should be cut off in case the pilot light is for any reason extinguished.

In installations with which we have heretofore been familiar these various controls were designed to operate upon different valves in the gas supply conduit so that there would be, in some installations, as many as four different gas controlling valves. This, of course, leads to complications and duplication of parts as well as an increase in the cost of manufacture and maintenance. Furthermore, the friction to the flow of the gas as it passes through these several valves often amounts to a considerable quantity, so that the accumulated pressure drop is sometimes as great as fifty percent of all of the pressure supplied.

With the foregoing in mind the principal object of our invention will be more fully appreciated and understood, the same being to simplify the control of the gas supply to a furnace so that any one or any combination of all of the foregoing controls can be effected through a single valve, and we prefer to apply our improved controlling mechanism to the so-called pressure regulating valve.

The accompanying drawings illustrate a preferred embodiment of the invention in which the principles are illustrated diagrammatically in the perspective Figure 1, and in which the pressure regulating valve is illustrated in vertical cross section in Figure 2, with the motor device for additionally controlling the pressure regulating valve illustrated in elevation in the same figure.

For the sake of this disclosure it will be assumed that the furnace A is of the hot water type, the burners of which are fed in the usual manner through the manifold 3 in the front of the furnace, the details of which, however, form no part of the invention, so that they will not be illustrated or described.

Gas is supplied to the manifold 3 through the gas supply conduit 4, the manifold 3 being in fact a continuation of the supply conduit 4. Within the housing 5 in the gas supply conduit 4 is a valve 6 which controls the flow of gas from the chamber 7 to the chamber 8.

The valve 6 is connected in a well known manner to the diaphragm 9 of the pressure regulating device 10.

The pressure regulating device 10 is in itself of a well known type and will, therefore, be but briefly explained. The chamber 11 on the upper side of the diaphragm is in communication with the chamber 8, and the lower face of the diaphragm is subject to the control of the pressure regulating spring 12 which can be adjusted by means of the screw 13 and nut 14. When the pressure in the chamber 8 rises above a point determined by the pressure on the spring 12, the diaphragm 9 will flex downwardly in order to close the valve 6.

Secured to the top of the casing 15 is located our motor device for additionally controlling the valve 6 in the manner now to be described.

Although it is not essential to adopt the particular type of motor device which we have shown, we prefer to use the same because of the convenient way in which it can be coupled to the various controlling devices now to be explained.

The motor device 15 consists essentially of a solenoid coil 16 within which moves the core 17. The core 17 is fitted with an extension 18 which is adapted to come in contact with the upper end of the valve 6.

When the current is not flowing through the coil 16, the core, of course, will be in its downward position as indicated in Fig. 2, and in this position the valve 6 will be held firmly to its seat by the extension 18, regardless of the pressure conditions obtaining in the line 4.

The coil 16 is connected to the source of the current indicated diagrammatically at 19 by means of the wires 20 and 21, which, it will be seen, are adapted to form a complete circuit when the switches 22, 23 and 24 are closed, but the circuit through which will be interrupted or broken if any one or all of the switches are open.

The switch 22 is what we may term the room or house switch and the same is controlled thermostatically in any desired way familiar to the art, so that when the temperature is below a predetermined standard, the switch will be closed, but when it is above the said standard it will be opened. In other words, whenever the switch 22 is calling for heat it will complete the circuit through the wire 21 at the point where it is located.

The switch 23 is what we are referring to in the present disclosure as the furnace switch, and in the present instance this furnace switch is controlled by a thermostat operated upon by the temperature of the water in the furnace. When this temperature falls below a certain point the switch 23 will close the circuit through the wire 21, but when it rises above, the switch 23 will break this circuit. In this way this switch also controls the valve 6.

The switch 24 is what we may term the pilot light switch which is also thermostatically controlled in a manner well understood in this art. If the pilot light becomes extinguished the switch 24 will break the circuit at the line 21 where it is located, but as long as the pilot light remains burning, the switch 24 will call for heat by maintaining the circuit complete at this point.

It will thus be seen that we have provided a control for the gas supply to a furnace which is extremely simple and which involves but a single valve for all of the types of control which it is desired to apply.

We should also like to point out that the thermostatic control exercised by the room temperature, the furnace temperature and the pilot light need not necessarily be in the manner shown, as it would be entirely possible, for example, to mechanically connect the various thermostats which operate these switches to the valve 6 and in this way eliminate the motor device 15. It is obvious, however, that the electric motor device which we have illustrated lends itself particularly well to our invention, and we prefer to use it.

Furthermore, instead of an electric motor device such as we have shown, we might employ some sort of a diaphragm valve which could be operated upon in various ways by the room thermostat, the furnace thermostat and the pilot light thermostat.

We claim:—

In a gas fired house heating plant, the combination of a furnace, a gas supply line therefor, a pressure regulating valve in said line, means for closing said regulating valve regardless of the pressure, a solenoid for preventing said means from closing the regulating valve, a thermostatic house switch, a thermostatic furnace switch, a thermostatic pilot light switch, and a circuit for supplying current to operate the solenoid, all of said switches being in series in said circuit.

In testimony whereof we have hereunto signed our names.

ALBERT WOLPERT.
EDWARD LAPP.